(12) United States Patent
Nagy et al.

(10) Patent No.: US 7,171,139 B2
(45) Date of Patent: Jan. 30, 2007

(54) SLEEVE ON A DRUM AND CHANGING SAID SLEEVE

(75) Inventors: Andreas Gustav Nagy, Munich (DE); Christian Compera, Schönau (DE); Udo Draeger, Speyer (DE); Torsten Ramm, Kiel (DE); Adolf Greiner, Sinsheim (DE); Edwin Mathes, Weisloch (DE)

(73) Assignee: Eastman Kodak Company, Rochester, NY (US)

( * ) Notice: Subject to any disclaimer, the term of this patent is extended or adjusted under 35 U.S.C. 154(b) by 291 days.

(21) Appl. No.: 10/887,664

(22) Filed: Jul. 9, 2004

(65) Prior Publication Data

US 2005/0069353 A1    Mar. 31, 2005

(30) Foreign Application Priority Data

Jul. 15, 2003    (DE)    ................... 103 31 943

(51) Int. Cl.
*G03G 15/00*    (2006.01)
(52) U.S. Cl. .................. 399/109; 399/116; 29/895.23; 242/575.1
(58) Field of Classification Search ............... 399/109, 399/159, 276, 302, 303, 304, 308, 116, 117; 29/895.23; 492/21, 42; 101/378, 410; 242/575, 242/575.1; 264/36.12, 36.16, 36.17; 269/48.1
See application file for complete search history.

(56) References Cited

U.S. PATENT DOCUMENTS

| | | | | |
|---|---|---|---|---|
| 1,056,480 | A | | 3/1913 | Wood |
| 3,851,519 | A | * | 12/1974 | Calvin et al. .................. 72/466 |
| 4,050,643 | A | * | 9/1977 | Secor ....................... 242/576.1 |
| 4,195,792 | A | * | 4/1980 | Hall ......................... 242/571.1 |
| 4,334,652 | A | * | 6/1982 | Blackburn ................ 242/575.3 |
| 4,964,586 | A | * | 10/1990 | Lerch ....................... 242/575.3 |
| 5,151,737 | A | * | 9/1992 | Johnson et al. ............. 399/117 |
| 5,216,954 | A | * | 6/1993 | Thompson ................... 101/375 |
| 5,541,709 | A | * | 7/1996 | Wilcox ........................ 399/116 |
| 5,752,444 | A | * | 5/1998 | Lorig .......................... 101/375 |
| 5,758,841 | A | * | 6/1998 | Ayffre et al. .............. 242/423.1 |
| 6,021,972 | A | * | 2/2000 | Inoue et al. .............. 242/575.3 |
| 6,131,003 | A | * | 10/2000 | Cais et al. ..................... 399/91 |
| 6,367,733 | B1 | * | 4/2002 | McLaughlin .............. 242/575.3 |
| 6,377,772 | B1 | * | 4/2002 | Chowdry et al. ........... 399/302 |
| 6,394,943 | B1 | * | 5/2002 | Cormier et al. ................ 492/47 |
| 6,546,867 | B1 | | 4/2003 | Franklin et al. |
| 6,578,483 | B2 | | 6/2003 | Compera et al. |
| 6,605,399 | B2 | * | 8/2003 | Chowdry et al. ............. 430/62 |
| 6,745,692 | B2 | * | 6/2004 | Lorig et al. ................. 101/375 |
| 6,874,415 | B2 | * | 4/2005 | Hoffmann et al. .......... 101/217 |
| 7,011,021 | B2 | * | 3/2006 | Dzierzynski et al. ....... 101/217 |

FOREIGN PATENT DOCUMENTS

| | | |
|---|---|---|
| DE | 964148 | 5/1957 |
| DE | 193336 | 11/1957 |

\* cited by examiner

*Primary Examiner*—Robert Beatty
(74) *Attorney, Agent, or Firm*—Lawrence P. Kessler (57) ABSTRACT

In replacing a sleeve on a printing machine drum, the diameter of the drum is reduced by moving the drum parts toward one another to facilitate removing the sleeve, and/or mounting another sleeve onto the drum, and increasing the drum diameter by moving the drum parts away from one another.

5 Claims, 10 Drawing Sheets

SLEEVE ON A DRUM AND CHANGING SAID SLEEVE

FIELD OF THE INVENTION

The invention pertains to a sleeve on a drum and a process for changing a sleeve on a drum.

BACKGROUND OF THE INVENTION

In the printing industry a number of rollers and drums are used for various purposes. Drums in printing machines are often equipped with sleeves that have various layers, and depending upon the use of the drum, fulfill different functions. For example, imaging cylinders in a photoelectric printing machine are equipped with photoelectric sleeves, that are capable of accepting a latent electrostatic image to which toner particles adhere, whereby a printed image is created that is transferred to a printing medium when the imaging cylinder is rolled over the printing medium. The sleeves on the drums are replaced from time to time, whereby the drum as the element that supports the sleeve, continues to be used, and is not replaced.

Prior art provides, for example, a compressed air mechanism for replacing the sleeve, which makes compressed air available from inside the drum. The diameter of the sleeve is enlarged by the compressed air, the strength of the bonding between the sleeve and the drum is diminished, and the sleeve that is ordinarily tightly held against the drum, can be slid off. A disadvantage of this prior art solution is the fact that a compressed air apparatus, along with a compressor for providing compressed air at several bars, must be available.

With the prior art process, not all kinds of sleeves can be securely attached to a drum. At a certain thickness and with certain characteristics of the material, the process for replacing the sleeve from the drum by compressed air fails to work. For example, sleeves made of thick metal cannot be slid onto a drum. The result is that metal sleeves with a smaller wall thickness are manufactured in order to assure that they can be mounted on a drum, whereby the manufacturing process becomes more complicated and expensive.

SUMMARY OF THE INVENTION

One object of the invention is to make it possible to easily replace sleeves on drums. An additional object of the invention is to mount, even thick-walled sleeves made of hard material onto a drum.

The invention achieves these objects by providing for replacing a sleeve on a drum in a printing machine, whereby the diameter of the drum is decreased, in that the drum parts are moved closer to one another, the sleeve is removed, another sleeve is slid onto the drum. The diameter of the drum is increased, by moving the drum parts away from one another. In addition, a sleeve-supporting drum for a printing machine is made available, where the drum has two drum halves that can be moved toward one another, in order to change the diameter of the drum.

The drum parts are beneficially placed under compression by at least one clamping bolt together with a compression spring for the purpose of moving the parts toward one another, and they are moved against the compression by an eccentric mechanism for the purpose of moving them apart from one another. In this way a simple structure is achieved.

As a particular benefit, the drum parts are placed under compression by at least one clamping bolt together with a compression spring, and to move the drum parts away from one another they are relieved of the compression via a second conical ring around a shaft of the drum that engages with a first slotted conical ring between the drum parts, and moves the drum parts away from one another.

In another embodiment of the invention, a shaft of the drum has a conical shape for engaging on the drum parts, for the purpose of moving the drum parts toward one another and apart from one another. In another special embodiment the drum is a processing apparatus for manufacturing and processing sleeves of every kind. In this instance the drum serves as a temporary mounting for the sleeves during the manufacturing process and processing. Because changing out the sleeves happens very often for these functions, the drum is particularly well suited for this purpose.

The drum is used in a particularly beneficial manner, as an imaging cylinder in an electro-photographic printing machine. Using the drum as an imaging cylinder also fulfills the increased demand for imaging cylinders with respect to precision fitting of the sleeve on the drum, where great precision is required for transfer of the image. In addition, because such drums are often replaced, the drum is capable of serving as a coated drum in a printing machine, for example, as a fuser roller, a pressure roller, or an intermediate roller.

The invention, and its objects and advantages, will become more apparent in the detailed description of the preferred embodiment presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
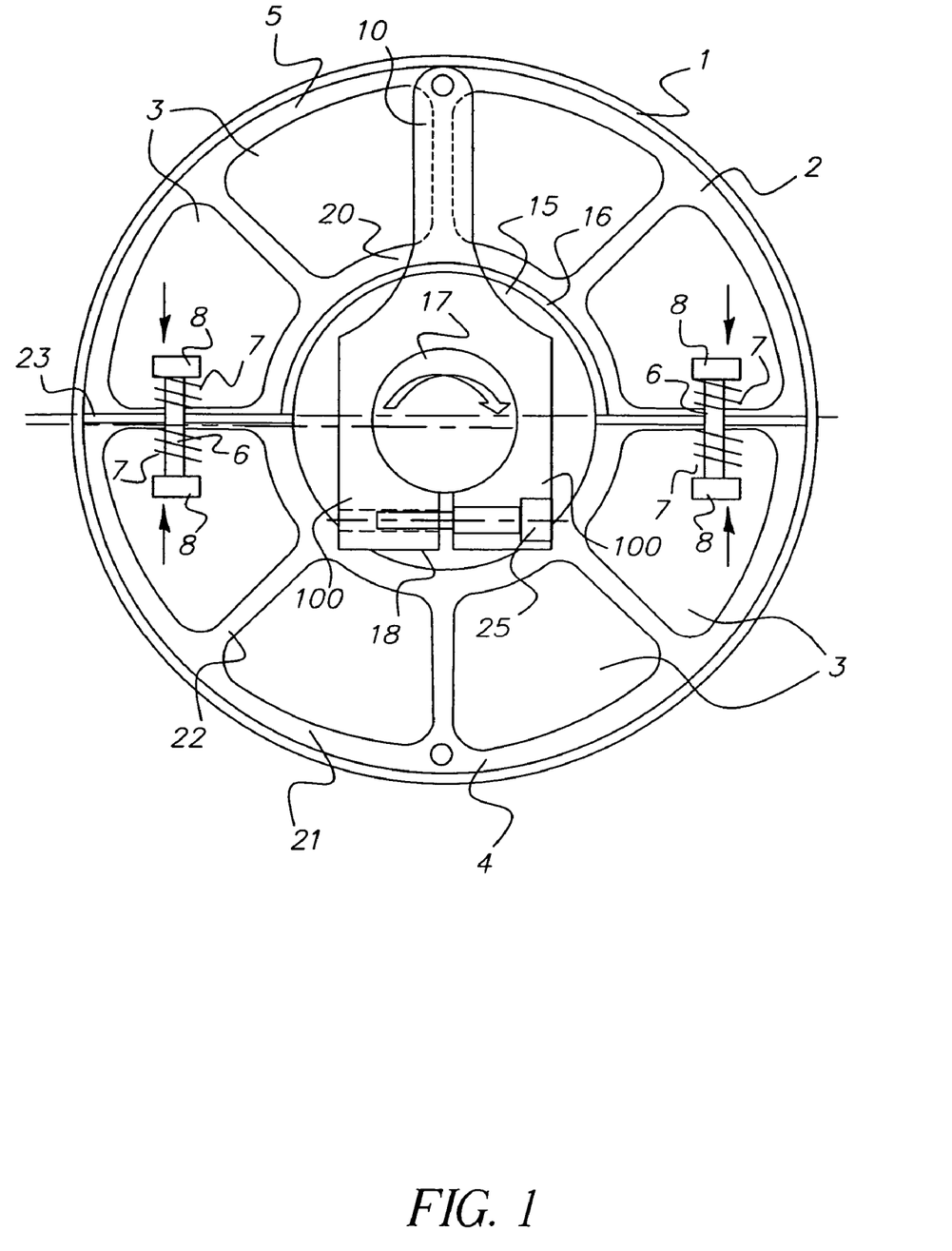
FIG. 1 shows schematically, a sectional side elevation of a drum with two clamping bolts, two compression springs, and a lever along with an eccentric mechanism for applying and releasing compression from sleeves of every kind.

Referring now to the accompanying drawings, FIG. 1 shows schematically, a side view of an exemplary drum 2, for example, for use as an imaging cylinder in an electrophotographic printing machine. The drum 2 can also be used, for example, to hold a sleeve that is being processed, i.e., the drum 2 is in such case an apparatus used for manufacturing and processing sleeves 1, and serves as a temporary mount. The drum 2 incorporates an eccentric mechanism 18 that is described below and is shown in FIG. 1 as an extruded profile. Other constructions of the drum 2 are feasible. The drum 2 has an inner bearing seat 20 and an outer bearing seat 21 that has a larger diameter than the inner bearing seat 20. The inner bearing seat 20 and the outer bearing seat 21 are joined together by ribs 22 that extend from the inner bearing seat 20 to the outer bearing seat 21, connect the two bearing seats, and are preferably manufactured as a unit from the same material as the bearing seats. Between the inner bearing seat 20, the outer bearing seat 21, and the ribs 22, are recesses which in this side view, have a near-trapezoidal shape.

The drum 2 includes a first drum part 4 and a second drum part 5. Each of the two drum parts 4 and 5 constitutes half of the drum 2, each having a flat side and a curved side, and when joined together on their flat sides they form a complete drum 2 between which is a crack 23, as shown in FIG. 1. When the two drum parts 4 and 5 are pushed together, the inner bearing seat 20 and the outer bearing seat 21 become closed rings, and a narrow crack 23 forms between the two drum parts 4 and 5. Inside the drum 2, a shaft 17 is mounted that rotates the drum 2 during operation.

The two drum parts 4 and 5 are tightly connected together along the crack 23 via two clamping bolts 6 that pass on both sides through holes located between the inner bearing seat 20 and the outer bearing seat 21. In FIG. 1, one clamping bolt 6 is placed on each of the two sides of the inner bearing seat 20, while two additional clamping bolts 6 are placed at corresponding locations at the other longitudinal end of the drum 2, however, the latter two bolts are not visible in FIG. 1. The two drums parts 4 and 5 are precisely and firmly attached to each other so that neither of the drum parts 4 and 5 overlap the other drum part 4 or 5, axially or vertically relative to the axis of the drum, i.e., the two drum parts 4 and 5 must be in suitable coincidence, one with the other. This is achieved mainly by the sleeve 1, which guides the two drum parts 4 and 5 tightly together. This results in the drum being formed into a geometrically precise cylinder shape.

Two clamping bolts 6 can be seen, one on each side of the drum 2. The clamping bolts 6 extend through holes in the ribs 22 of the first drum part 4, and through holes in the ribs 22 of the second drum part 5, whereby the holes of the first drum part 4 and the second drum part 5 align, and the clamping bolts 6 extend from a recess 3 in the first drum part 4 to a recess 3 in the second drum part 5.

Encircling each of the clamping bolts 6 are two compression springs 7, whereby each clamping bolt 6 has a compression spring 7 in the first drum part 4, and a compression spring 7 in the second drum part 5. The ends of the compression springs 7 make contact respectively with the bolt head 8 of the clamping bolt 6 and the rib 22 of each drum part 4 and 5, and the springs are compressed between the two. The compression springs 7 exert a force in the direction shown by the arrow, which ascertains, that the first drum part 4 and the second drum part 5 are pressed securely against one another. In this way, a force exerted between the drum parts 4 and 5 presses the drum parts 4 and 5 against one another.

In addition, a lever 10 is mounted on the drum 2, which encircles the shaft 17 at one end of the drum 2, so that pushing on the lever 10 results in rotation of the shaft 17. The lever 10 is used here as an example, and serves to secure the shaft 17 so that it cannot turn, relative to the bearings 12 and 14 of the drum parts 4 and 5. Other mechanisms for securing the shaft 17, so as to prevent turning are feasible. For this purpose, the lever 10 has two lever arms 100 that embrace the shaft 17, whereby a pin 25 connects both lever arms that secure the shaft 17 to one another and assures that the lever arms 100 embrace the shaft 17 securely and tightly, so that the lever 10 is clamped to the shaft 17. Securing the lever 10 to the shaft 17 with the lever arms 100 assures that a movement of the lever 10 is converted to a rotation of the shaft 17.

When the shaft 17 is rotated by the lever 10, the diameter of the drum 2 is changed as described below. The drum parts 4 and 5 are moved toward one another, in the direction of the arrow, by rotation of the lever 10 and the resulting exertion of force. The drum parts 4 and 5 are pressed against one another by the compression springs 7. This is the condition in which the sleeve 1 is slid onto the drum 2, namely, the condition of the drum 2 with the compression relieved. After the sleeve 1 has been slid onto the drum 2 the lever 10 is moved against the direction of the curved arrow and back into its initial position as shown in FIG. 1. This results in the diameter of the drum 2 increasing to its standard diameter. This is the diameter that is suited for operation of the ideally, cylindrically shaped drum 2. The drum parts 4 and 5 move apart from one another. FIG. 1 shows a sleeve 1 that has been slid onto the drum 2; such a sleeve usually consists of a thin-walled pipe. After the sleeve 1 has been slid onto the drum 2 and the diameter of the drum has been enlarged, the drum 2 is ready for operation. In its operationally ready condition, the drum 2 has an optimally round cylindrical shape; as opposed to the situation that exists when the drum is not under compression, namely, the drum 2 is not out of round.

Figure 2:
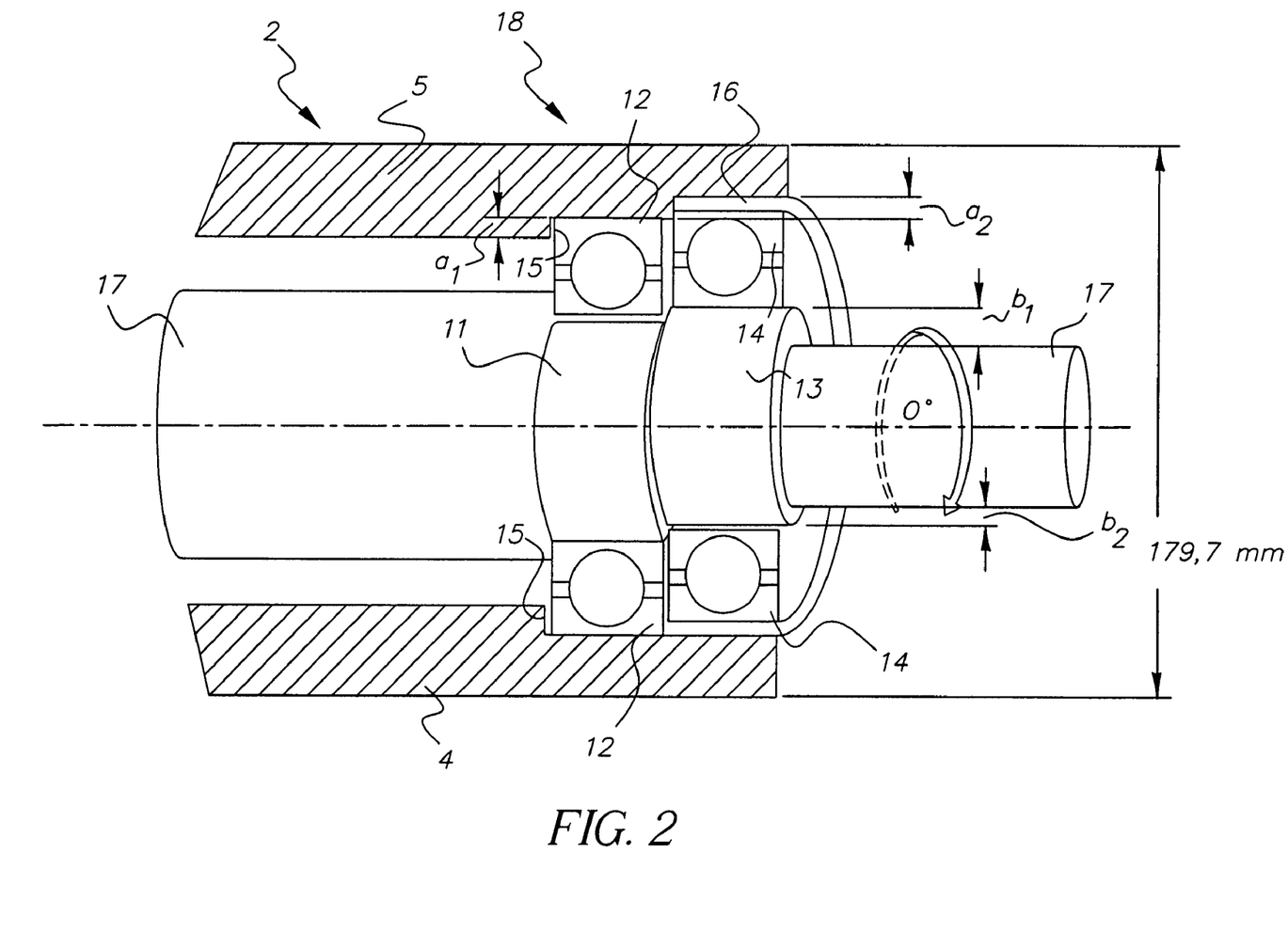
FIG. 2 shows schematically, a longitudinal section of the drum, whereby the clamping bolt springs are relieved of compression, and the diameter of the drum around the eccentric path is reduced.

FIG. 2 shows a side section through an embodiment of the drum 2 of the invention. Shown is a first eccentric disk 11 on the shaft 17, through the center of which the shaft 17 extends. Encircling the first eccentric disk 11 is a first bearing 12, which has the same width as the first eccentric disk 11 and which on its outer side, extends into a first recess 15 on the inner side of the first drum part 4 and the second drum part 5. The first recess 15 is formed evenly on the inner side of the first drum 4 and the second drum 5 and has a depth $a_1$ on the inner side of the first drum part 4 and the second drum part 5. The depth $a_1$ of the first recess 15 amounts, for example, to 0.3 mm. The circumferential surface of the first bearing 12 lies on the inner surface of the first drum part 4 and the second drum part 5, in the first recess 15. The drum parts 4 and 5 are supported on the first bearing 12.

In addition, a second eccentric disk 13 is provided next to the first eccentric disk 11, which corresponds in size approximately to the first eccentric disk 11, and through which the shaft 17 extends, not through the center, but eccentrically. One of the side surfaces of the second eccentric disk 13 lies against a side surface of the first eccentric disk 11. The drum 2 is not to be operated in the compression free condition shown in FIG. 2. This condition is used only for replacing the sleeve 1. The drum 2, with the sleeve 1, does not have an optimally cylindrical form when in this condition. The first eccentric disk 11 and the second eccentric disk 13 are shifted radially a certain distance apart from one another. The axes of the first eccentric disk 11 and the second eccentric disk 13 are not in alignment with one another, as can be seen in FIG. 2.

The distance between the upper surface of the shaft 17 and the circumferential surface of the second eccentric disk 13 on one side of the shaft 17, is shown by $b_1$, while the distance between the shaft 17 and circumferential disk 13 on the opposite side of the shaft 17, is shown by $b_2$, whereby $b_1$ is not equal to $b_2$. In this case $b_1$ is greater than $b_2$. This means that the second eccentric disk 13 on the shaft 17 is out of round or balance, relative to the shaft 17, because the shaft 17 does not extend through the center of the second eccentric disk 13. The second eccentric disk 13 has, as does the first eccentric disk 11, a second bearing 14 that embraces the second eccentric disk 13, whereby the outer side of the second bearing 14 extends into the first recess 15 in the first drum part 5, while its outer side extends into a second recess 16 in the second drum part 5.

The second recess 16 on the inner side of the second drum part 5 is deeper than is the first recess 15 on the inner side of the first drum part 4 and the second drum part 5. The depth of the second recess 16, relative to the first recess 15 on the inner side of the second drum part 5, is shown by $a_2$. Thus, two steps are formed on the inner side of the second drum part 5, a first step from the inner side of the second drum part 5 to the first recess 15, and a second step from the first recess 15 to the second recess 16. On the inner side of the first drum part 4, a step is formed from the inner side of the first drum part 4 to the first recess 15, but there is no second step. Viewed from the inner side of the second drum part 5, the second recess 16 is deeper in the second drum part 5 than the first recess 15. The first recess 15 passes over from the first drum part 4 to the second drum part 5, without an offset or a step, while the second recess 16 in the second drum part 5 forms an offset, or a step, with the first recess 15 in the first drum part 4. In this condition, the shaft 17 is rotated such that the second bearing 14 around the second eccentric disk 13 extends into the second recess 16, and exerts no pressure on the inner side of the second drum part 5, so that the free second drum part 5 presses against the first drum 4.

The circumferential surface of the second bearing 14 in the area of the inner side of the second drum part 5, shown in FIG. 2 above, does not butt against the recess 16, and it is also at a certain distance from the inner surface in the area of the inner side of the first drum part 4, shown in the lower part of FIG. 2. Therefore, the second bearing 14 is not in contact with the drum parts 4 and 5. The distance of the drum parts 4 and 5 from one another is defined and determined by the diameter of the first bearing 12. The subject condition is referred to as the compression-free condition, because the sleeve is no longer held in place by drum parts 4 and 5, and the sleeve is easily replaceable because of the play between it and the drum 2. In the condition depicted in FIG. 2, the drum parts 4 and 5 lie close to one another, and the diameter of the drum 2 is minimal. The two drum parts 4 and 5 are closer to one another in FIG. 2 than in FIG. 3. Thus, a manual replacement of the sleeve 1 is also possible. The shape of the drum 2 continues to be adjustable and changeable by the compression springs.

Figure 3:
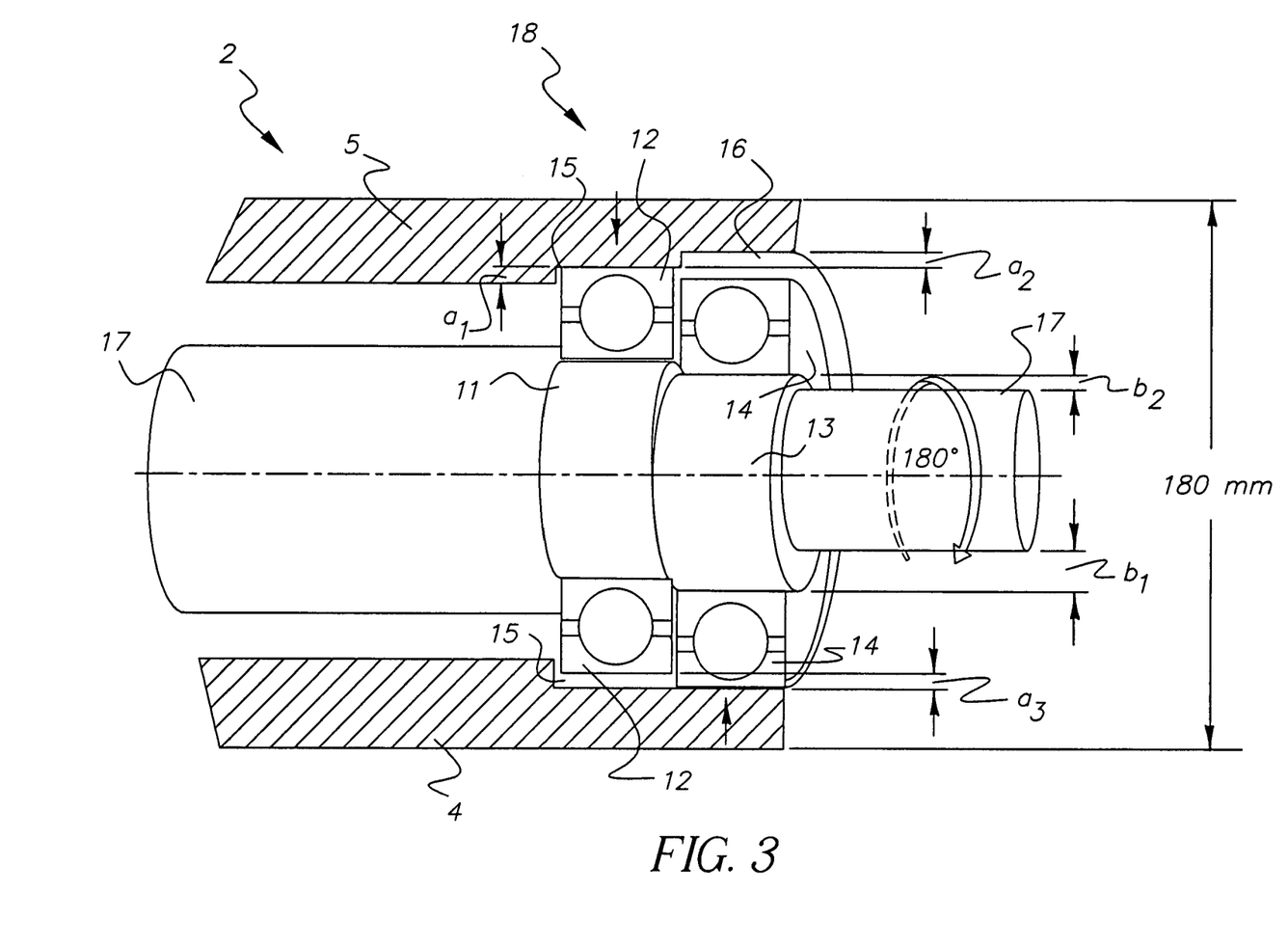
FIG. 3 shows schematically, a longitudinal section of the drum, similar to the view shown in FIG. 2, whereby the clamping bolt springs are under compression, and the diameter of the drum is increased to a standard compressioned size, whereby the sleeve fits tightly on the drum.

FIG. 3 shows a side view that is similar to the one in FIG. 2, but the condition here is the under-compression condition. The shaft 17 has been rotated by reversing the lever position, for example, by 180°, compared to the position of the shaft 17 in FIG. 2. As can be seen, the second eccentric disk 13 is now in a different position, relative to the first eccentric disk 11, than was the case in FIG. 2. The second eccentric disk 13 and the second bearing 14 that is attached to it have been rotated along with the shaft 17. The larger distance $b_1$ from the shaft 17 to the outer side of the second bearing 14 is now, after reversal, of the position of the lever 10, located on the lower side of the second eccentric disk 13. The smaller distance $b_2$ is located on the opposite side, i.e., on the upper side of the second eccentric disk 13. Consequently, the second bearing 14, which encircles the second eccentric disk 13, has been moved out of the second recess 16 of the drum part 5.

In the under-compression condition the second bearing 14 projects out into the first recess 15 of the second drum part 5 and the first drum part 4. The circumferential surface of the second bearing 14 is now located in the area of the inner side of the second drum part 5, shown in the upper area of FIG. 3, in the first recess 15 at a certain distance from the second recess 16, while in the area of the inner side of the first drum 4, shown in the lower area of FIG. 3, in the first recess 15 it abuts against the inner surface of the first drum part 4. One half of the second bearing 14 that is located in the first drum part 4 borders on the inner surface of the first drum part 4, while the other half of the bearing 14 that is located in the second drum part 5 does not border on the inner surface of the second drum part 5. In other words, the drum part 5 rests on the first bearing 12 and drum part 4 rests the second bearing 14. The drum parts 4 and 5 have, relative to their positions in the compression-free condition as shown in FIG. 2, been moved farther apart from one another.

The positioning of the eccentric second eccentric disk 13 has been selected so that the standard target dimension of the drum 2 is achieved. The first bearing 12 surrounding the first eccentric disk 11, which is not out of round relative to the shaft 17, is located in both conditions, i.e., the under-compression condition and the compression-free condition, at the same level in the first recess 15. Because the drum parts 4 and 5 are farther apart from one another in the operational or under-compression condition, the first bearing 12 borders only the inner surface of the second drum 5; and in the first drum part 4 there is a certain distance between the first bearing 12 and the inner surface of the first drum part 4. The under-compression condition that is shown here, is characterized by the fact that the first bearing 12 abuts tightly against the second drum part 5, and the second bearing 14 abuts tightly against the first drum part 4, whereby the drum parts 4 and 5 are moved during operation, by a friction fit with bearings 12 and 14. In the under-compression condition as shown in FIG. 3, the operational condition, the diameter of the drum 2 is, relative to the condition as shown in FIG. 2, increased to its standard size, i.e., the operational condition for printing or for processing the sleeve 1 is achieved because the sleeve 1 is securely held on the drum 2. Both of the drum parts 4 and 5 are located farther apart from one another in FIG. 3 than in FIG. 2. In this condition it is not possible to replace the sleeve.

Figure 4A:
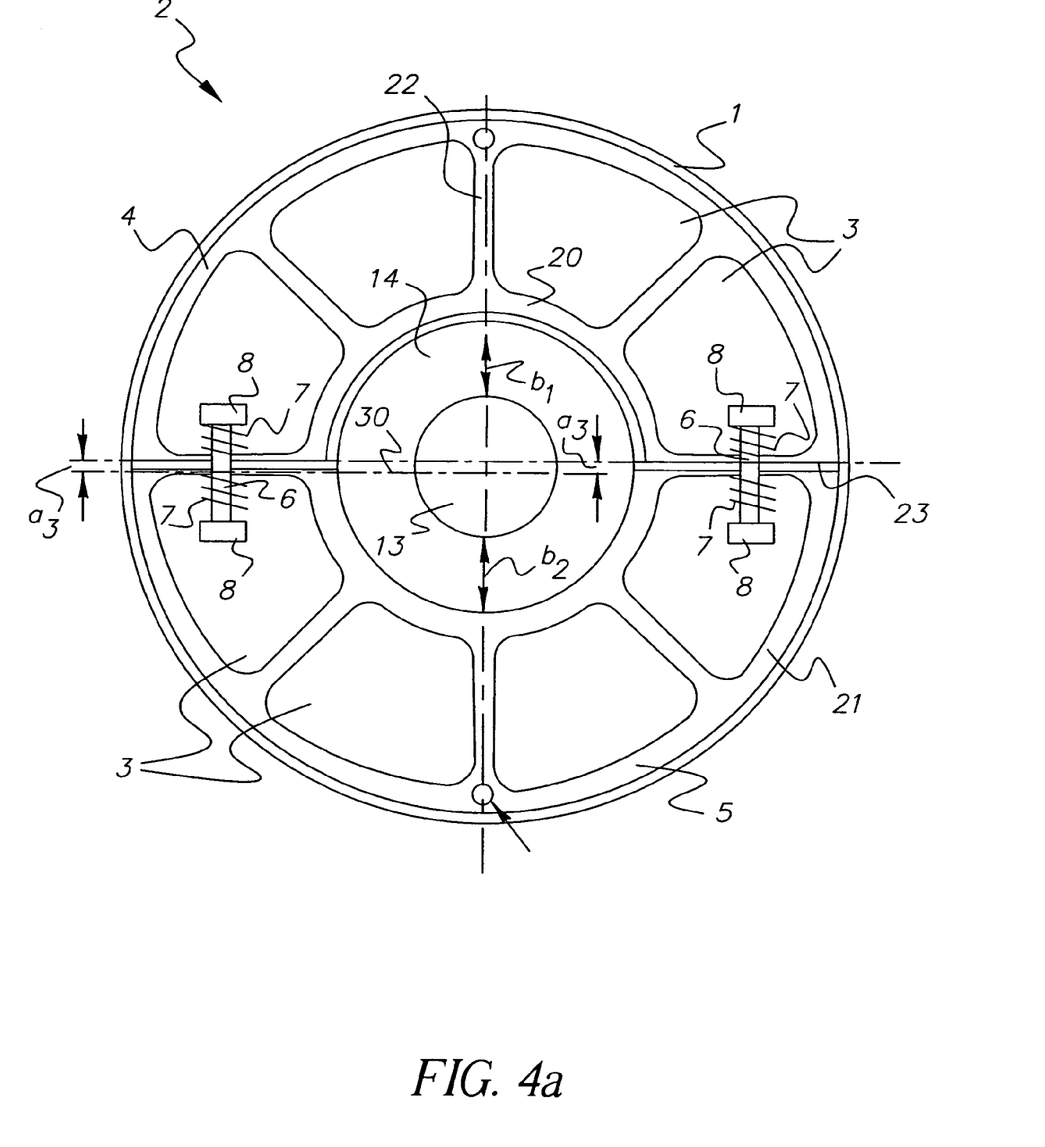
FIG. 4*a* shows schematically, a side view of the drum similar to the view shown in FIG. 1, without the lever, however, whereby the eccentricity of a second bearing is illustrated, the clamping bolt springs are under compression, and the sleeve fits tightly on the drum.

FIG. 4*a* schematically shows a side view of a drum 2 in an embodiment of the invention that is similar to that shown in FIG. 1. Shown here is a section through the second eccentric disk 13 and the second bearing 14. A dashed line shows the center line of the drum 2. It can be seen, that the center line of the drum 2 does not coincide with the below-lying center line 30 of the second eccentric disk 13 and the second bearing 14. The center line 30 of the second eccentric disk 13 runs through the second eccentric disk 13, which is at a distance $a_3$ from the center line of the drum 2. This distance $a_3$, is the eccentric throw of the drum 2. The shaft 17, not shown in FIG. 4*a*, has been rotated by the lever 10 into the position shown in FIG. 3. When the lever 10 is in this position, the drum 2 is in its under-compression condition, in which the diameter of the drum 2 is set at its standard size, and the sleeve 1 is securely held in place and is ready for operation. For operation of the printing machine the drum 2 is in the condition shown in FIG. 4*a*.

Figure 4B:
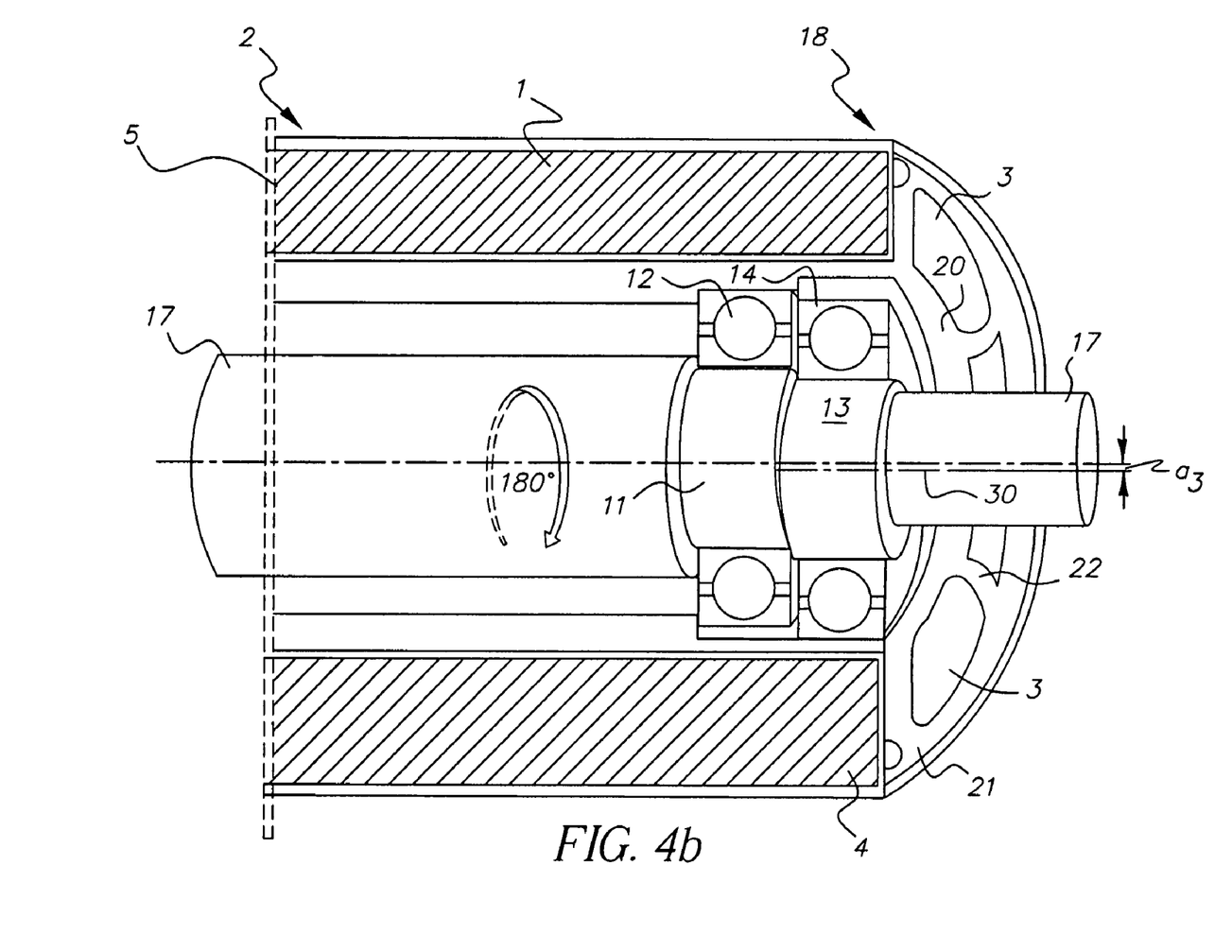
FIG. 4*b* shows schematically, a longitudinal section of the drum similar to the view shown in FIG. 3, whereby the drum is under compression as in FIG. 4*a;*

FIG. 4*b*, schematically shows a longitudinal section of an embodiment of the drum 2 in the same under-compression condition as is shown in FIG. 3 and FIG. 4*a*. The center line of the shaft 17, shown by a dashed line, runs through the center of the first eccentric disk 11, but not through the center of the second eccentric disk 13. The center line 30, running through the second eccentric disk 13, is at a distance $a_3$ from the center line of the first eccentric disk 11, and from the center line of the drum 2, the eccentric throw. The circumferential surface of the first bearing 12, surrounding the first eccentric disk 11 abuts against the inner surface of the first drum part 5, and is at a certain distance from the inner surface of the second drum part 4. The circumferential surface of the second bearing 14, surrounding the second eccentric disk 13, abuts against the inner surface of the first drum part 4, and is at a certain distance from the inner surface of the second drum part 5.

Figure 5:
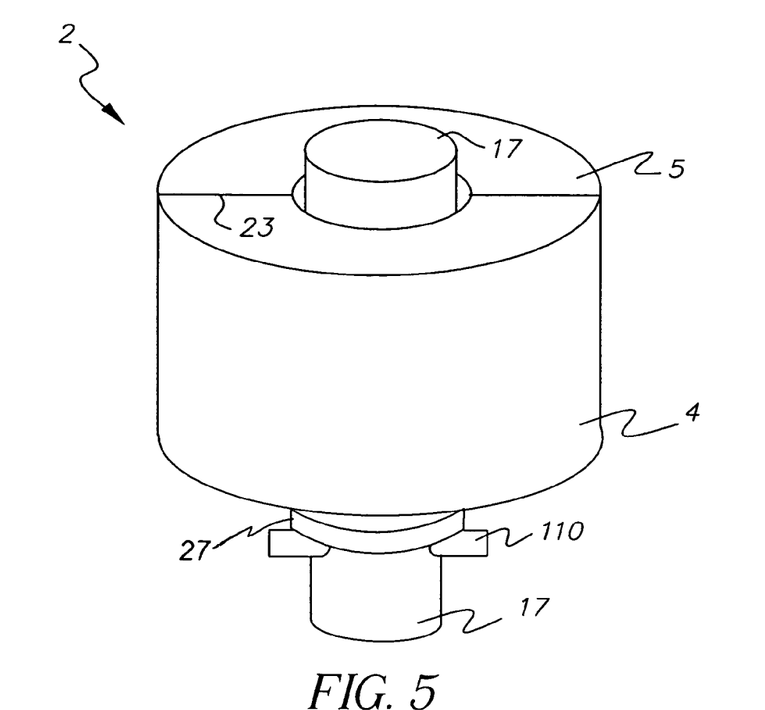
FIG. 5 shows a perspective view of the drum, with the two drum parts of an alternative embodiment of the invention.
Figure 6:
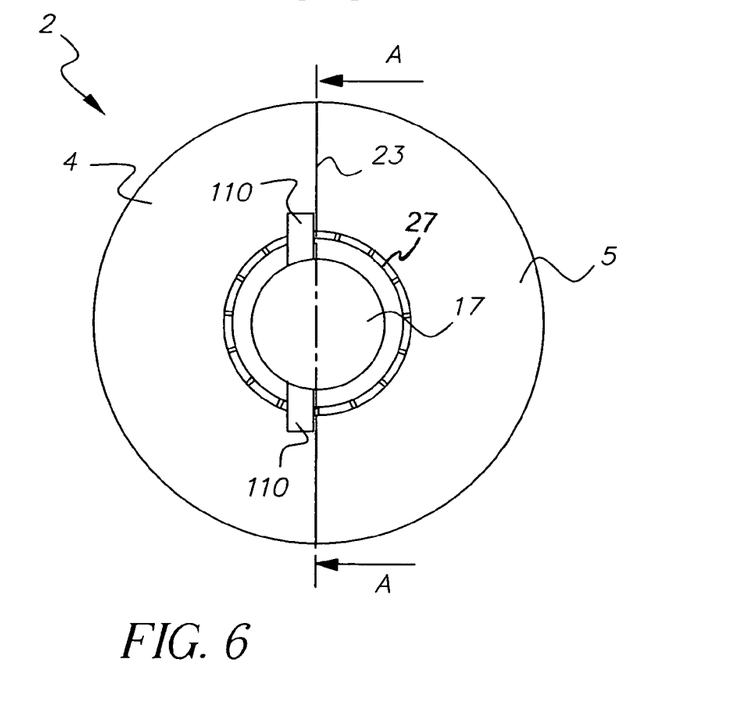
FIG. 6 shows a cross section through the drum, with the two drum parts as in FIG. 5.
Figure 7:
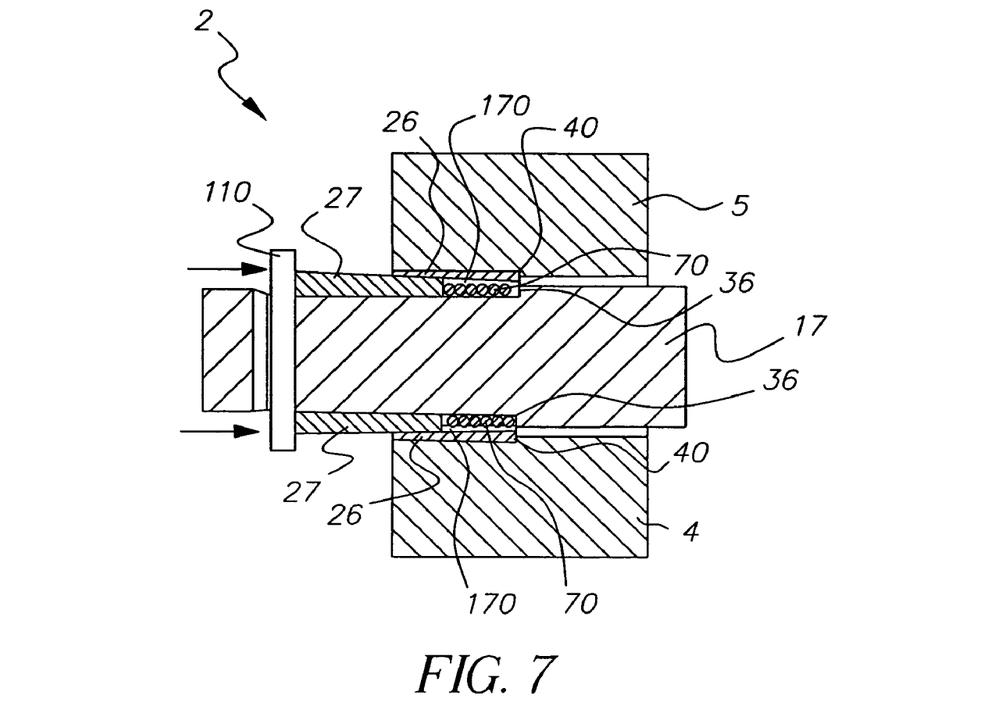
FIG. 7 shows a longitudinal section through the drum, with the two drum parts as in FIG. 5, with a second slotted ring on the shaft with conically shaped outer surfaces and first ring near the drum parts with corresponding inner surfaces.

FIG. 5 shows a perspective view of an embodiment of the invention, which has a shaft 17, that passes through two solid drum halves 4 and 5, similar to what is shown in the previous example. A pin 110 runs through the shaft 17; its purpose is to slide a conical second slotted ring 27 along the shaft 17. The structure and function of this embodiment will be described below, with the aid of the drawings that follow. FIG. 6 shows a bottom view of the view shown in FIG. 5. FIG. 7 shows a longitudinal view through the drum parts 4 and 5, and the shaft 17 from FIGS. 5 and 6, whereby the structure of the embodiment is graphically shown. The second, multi-slotted ring 27, which is cone shaped, surrounds a section of the shaft 17. The outer surface of this second slotted ring 27 tapers in the direction of drum parts 4 and 5. On the inner side of the drum parts 4 and 5 is a first slotted ring 26, on which the outer surface of the cone shaped, second slotted ring 27 slides along the shaft 17. When the pin 110, along with the second slotted ring 27, is pushed in the direction of the arrow, between the drum parts 4 and 5 and the outer surfaces of the second slotted ring 27 on the shaft slide along the inner surfaces of the first slotted ring 26, the drum parts 4 and 5 are pressed apart. The drum parts 4 and 5 move away from one another, and the diameter of the drum 2 is increased.

A spring 70 located in a recess 170, which is in the shaft 17, encircles the shaft 17, and begins at the tapered end of the cone shaped, second slotted ring 27, and ends at a first detent 36. The spring 70, on the shaft 17, is compressed when the pin 110 is pushed in, whereby the spring 70, together with the second slotted ring, is pushed in the direction of the drum parts 4 and 5, until the ring reaches a final position, at which the diameter of the drum 2 is increased, and the drum 2 with the sleeve in place is ready for operation. For replacement of the sleeve 1, the diameter of the drum 2 is reduced in that the second slotted ring 27 is moved away from the drum parts 4 and 5, whereby the spring expands and relaxes, and the drum parts 4 and 5 move toward one another. The spring 70 exerts an outward force against the direction of the arrow, and contributes greatly to the fact that the second slotted ring 27 is moved away from the drum parts 4 and 5. The result is that replacing the sleeve 1 becomes a great deal easier.

Figure 8:
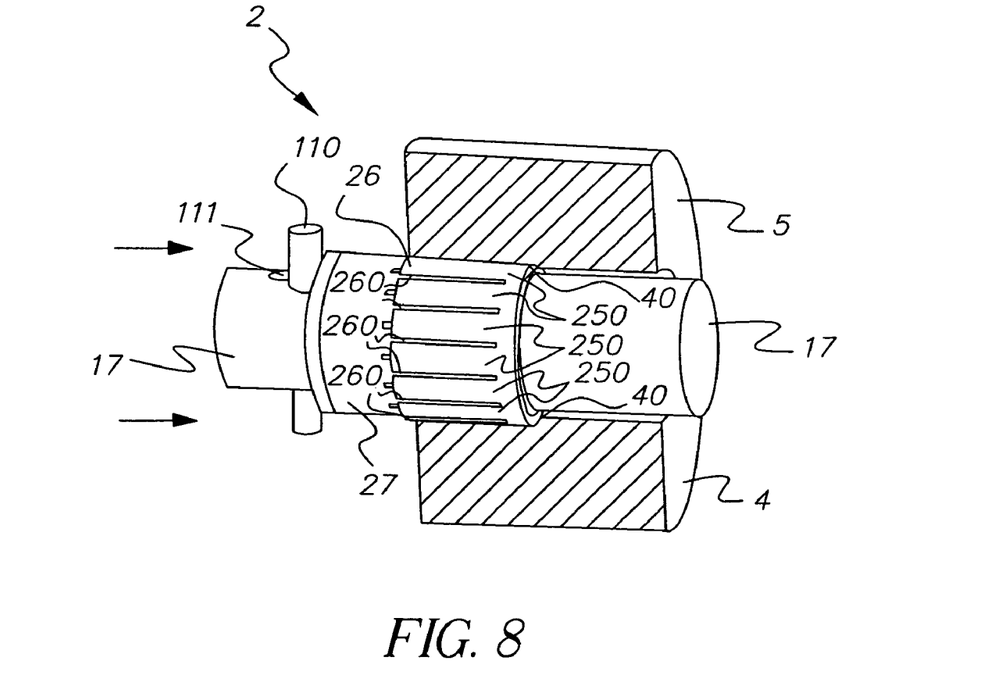
FIG. 8 shows a perspective cutaway view of a drum, similar to the ones in FIGS. 5 through 7.

FIG. 8 shows a perspective cutaway view of the embodiment of the invention, shown in FIGS. 5 through 7. In this view, the drum parts 4 and 5 are of solid construction. Visible here, in particular, is the first slotted ring 26 that is located between the drum parts 4 and 5 and the shaft 17. The first slotted ring 26 contains a number of neighboring fingers 250, which are both separated from each other and formed by the slots 260. The second slotted ring 27 has a similar construction, so that the conical surfaces of the first slotted ring 26 and the second slotted ring 27 come together, one with the other. The end of the first slotted ring 26, which is located between the drum parts 4 and 5 and faces inward relative to the drum 2, abuts against a second detent 40, that is formed from a shoulder on the inner side of the drum parts 4 and 5. The first slotted ring 26 is solid and flexible, so that pressure applied to it from the outer side of the first slotted ring 26 reduces the diameter of the first slotted ring 26. This change in diameter is assured by the fact that the first ring 26 is especially constructed to have slots 260.

If the second slotted ring 27 is pushed toward the drum parts 4 and 5 in the direction of the arrow by a force applied to the pin 110, a force from the inner side of the drum parts 4 and 5 acts upon the slotted ring 26, so that the fingers 250 move away from one another, and the slots 260 become wider. By the cone-shaped second slotted ring 27 on the shaft 17, whose diameter increases toward the outside relative to the drum parts 4 and 5, against the direction of the arrows, the force that is acting on the slotted ring 26 from the inside is increased when the pin 110 is pushed in. The pin 110 makes contact with the first slotted ring 26 and the force applied to the pin 110 is transmitted to the first slotted ring 26. The outer part of the second slotted cone-shaped ring 27 that has a larger diameter is pushed between the drum parts 4 and 5. While this is occurring, an increasing force from the first slotted ring 26 to the inner sides of the drum parts 4 and 5 develops, which causes the diameter of the drum 2 to increase.

When pulling on the pin 110 causes the pin 110 to be pulled out of the drum parts 4 and 5, the fingers 250 of the first slotted ring 26 move toward one another, the slots 260 become narrower, the force on the inner side of the drum parts 4 and 5 abates, and the diameter of the drum 2 decreases in size. Now, one part of the second slotted cone-shaped ring 27 that has a smaller diameter than the other part with the larger diameter, the tapered part, is still located between the drums 4 and 5, the other part of the slotted cone-shaped ring 27 that has a larger diameter, is located outside the drum 2, separated from the two drum parts 4 and 5. In this case, the diameter of the drum 2 is decreased.

Figure 9:
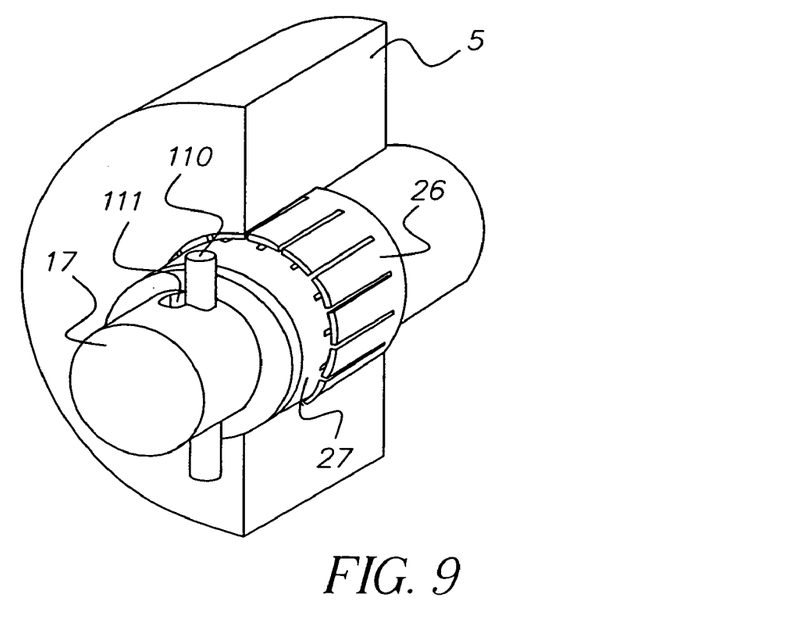
FIG. 9 shows a perspective cutaway view of a drum like the one in FIGS. 5 through 8, in which an L-shaped recess for guiding the pin can be seen.

FIG. 9 shows a perspective cutaway view of the embodiment, as shown in FIGS. 5 through 8. Here, an L-shaped recess 111, for guiding the pin 110, has been formed in the shaft 17. It extends from one side of the shaft 17 to the other, as can be seen in FIG. 7. The pin 110 fits vertically into the L-shaped recess 111 from one side of the shaft 17, and comes out on the other side of the shaft 17. The L-shaped recess 111 has a longer, longitudinal recess that runs parallel to the axis of the shaft 17, and an equally wide, shorter, longitudinal recess that runs perpendicular to the axis of the shaft 17 and connects with the other recess. The pin 110 is inserted into the L-shaped recess in the larger section parallel to the axis of the shaft 17 for pushing the first slotted ring 27 in and out, and the pin locks in position in the smaller section perpendicular to the axis of the shaft 17 when the first slotted ring 27 is pushed the proper distance into the drum 2, and the drum parts 4 and 5 are apart from one another, i.e., the diameter of the drum 2 is increased as described above. When the pin 110 becomes locked in place in the smaller longitudinal recess perpendicular to the axis of the shaft 17 of the L-shaped recess 111, the positions of the pin 110 and the first slotted ring 27 that abuts against the pin 110 are securely fixed, as is the diameter of the drum 2. The drum 2 is then ready for use.

Figure 10:
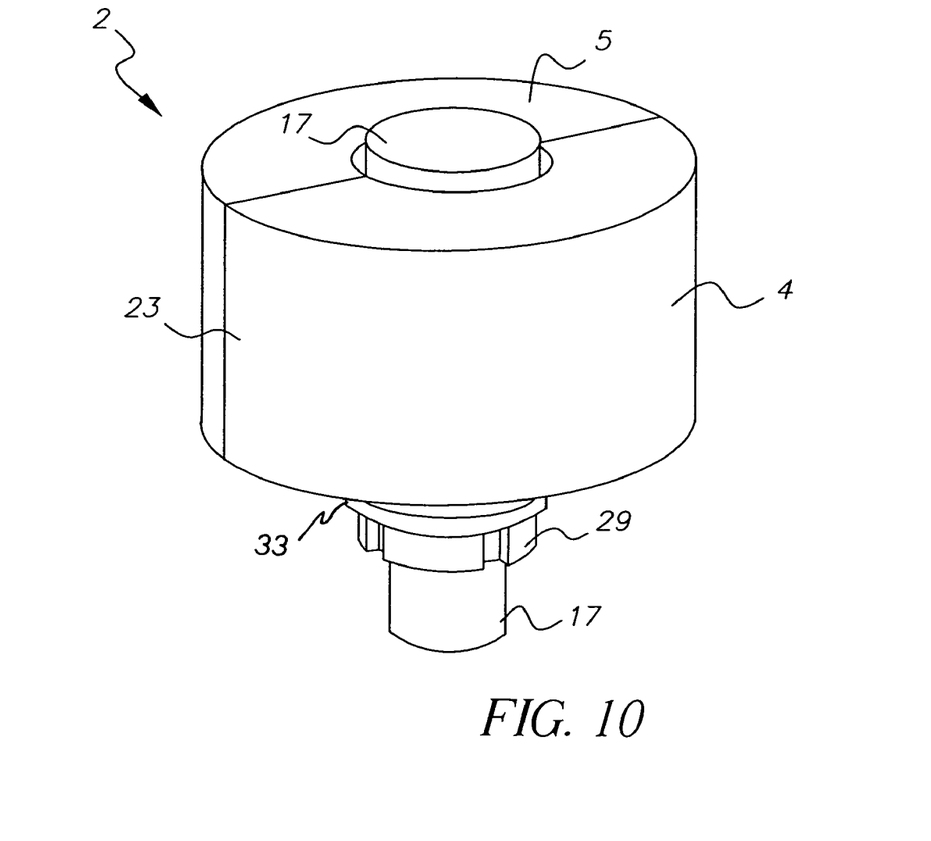
FIG. 10 shows a perspective view of an alternative embodiment of the invention.
Figure 11:
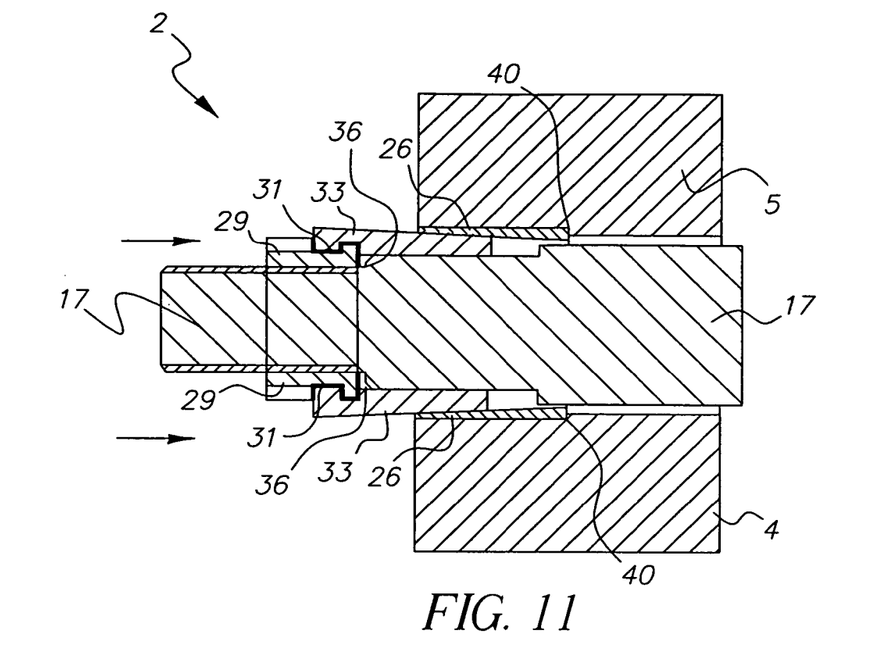
FIG. 11 shows a cross section of the embodiment shown in FIG. 10 with (1) a shaft nut and corresponding threads in a third slotted ring with cone-shaped slotted outer surfaces, whereby the third slotted ring can be pushed forward and backward on a shaft; and (2) the third slotted ring with corresponding cone-shaped inner surfaces.

FIG. 10 shows a perspective view of another embodiment of the invention. Here, the change in diameter of drum 2 is accomplished by an arrangement that is described in the following drawings. FIG. 11 shows a cross section through the two drum parts 4 and 5 and through the shaft 17. Attached to the shaft 17 is a threaded shaft nut 29. A third slotted ring 33, which encircles the shaft 17, and can be moved along it, engages with the shaft nut 29, whereby the third slotted ring 33 is connected to the shaft nut 29. The third slotted ring 33 has a conical surface, whereby the third conical ring 33 becomes narrower in the direction of drum 2. The side of the third slotted ring 33 that lies against the shaft nut 29, has a greater diameter than the side of the third slotted ring 33 that lies against the drum parts 4 and 5. The first slotted ring 26, along which the outer surfaces of the third slotted ring 33 slide when the shaft 17 is moved, is located on the inner sides of the drum parts 4 and 5. When the shaft nut 29 is turned, it moves in the direction of the arrow, and the third slotted ring 33 also moves because it is connected to the shaft nut 29. The third slotted ring 33 moves in the direction of the arrow, along the shaft 17, until the shaft nut 29 reaches the first detent 36, which runs around the shaft 17 and forms a shoulder on it. The shaft 17, thus, has an offset at the first detent 36 at which the diameter of the shaft 17 increases in the direction of the drum 2. Because of the conical shape of the third slotted ring 33 when it is inserted, the diameter of the first slotted ring 26, increases and the drum parts 4 and 5 that are lying against the first slotted ring 26, are pressed apart. Turning the shaft nut 29 causes the drum parts 4 and 5 to separate from one another and the diameter of the drum 2 to increase.

Figure 12:
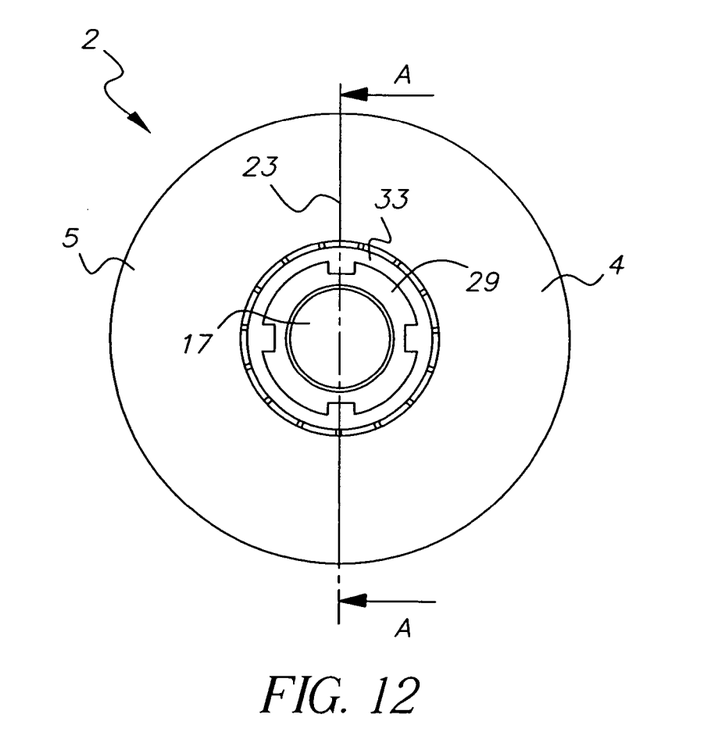
FIG. 12 shows a cross section of the drum shown in FIGS. 10 and 11.
Figure 13:
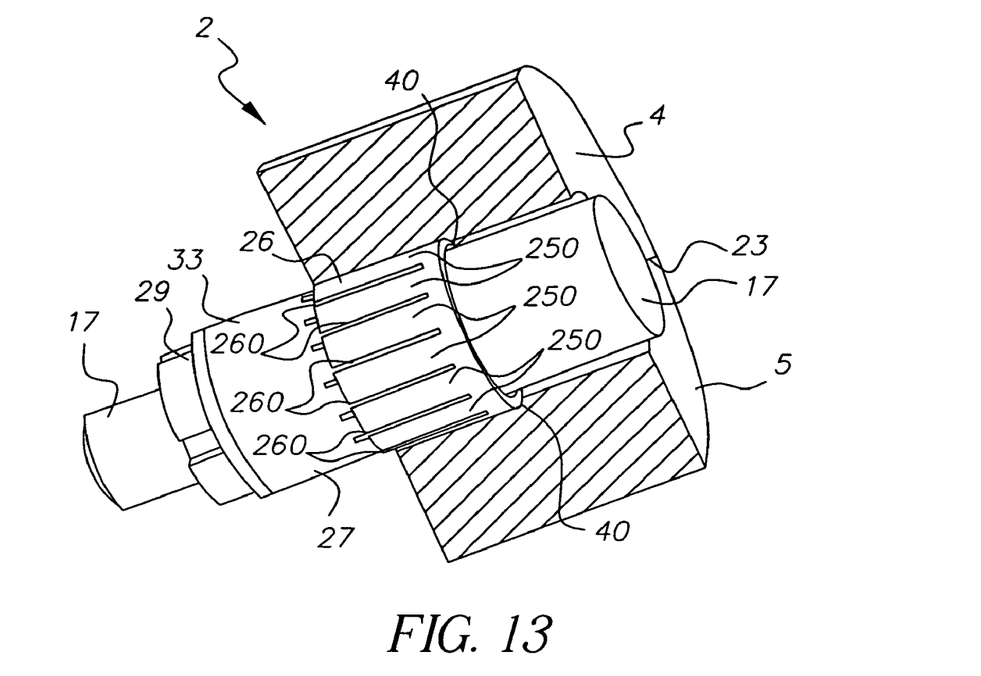
FIG. 13 shows a perspective cutaway view of the drum shown in FIGS. 10 through 12.
Figure 14:
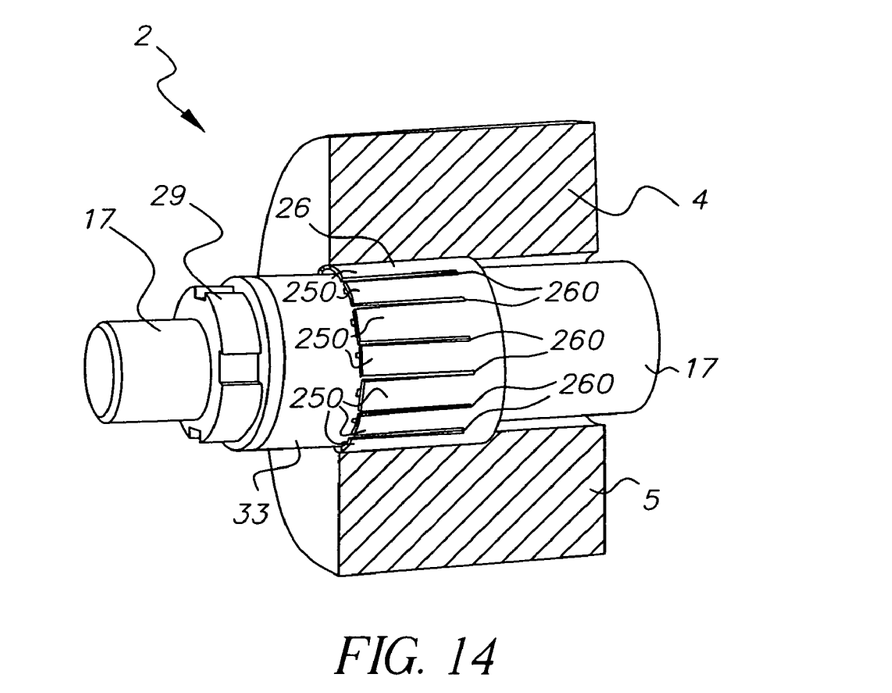
FIG. 14 shows another perspective view of the drum shown in FIG. 13.

FIG. 12 shows a bottom view of the drum 2 as it is shown in FIG. 10, along with the shaft nut 29 and the drum parts 4 and 5. FIG. 13 shows a perspective cutaway view of the above embodiment with the first slotted ring 26, and the second slotted ring 27, which encircle the shaft 17. Finally, FIG. 14 shows another cutaway perspective view, similar to that shown in FIG. 13. The operation is in each case as described in detail above.

The invention has been described in detail with particular reference to certain preferred embodiments thereof, but it will be understood that variations and modifications can be effected within the spirit and scope of the invention.

PARTS LIST 1 sleeve
2 drum
3 recesses
4 first drum part
5 second drum part
6 clamping bolts
7 compression spring
8 bolt heads
9 lever
11 first eccentric disk
12 first bearing
13 second eccentric disk
14 second bearing
15 first recess
16 second recess
17 shaft
18 eccentric mechanism
20 inner bearing seat
21 outer bearing seat
22 ribs
23 crack
25 pin
26 first slotted, conical ring
27 second slotted, conical ring
29 shaft nut
30 center line
31 threads
33 third slotted ring
36 first detent
40 second detent
70 spring
100 lever arm
110 pin
111 L-shaped recess
170 recess
250 finger
260 slot

What is claimed is:

1. A drum (2) for a printing machine, which has a sleeve (1), comprising: the drum (2) includes two drum parts (4 and 5) that can be moved relative to one another for said purpose of changing the diameter of said drum (2), said drum parts (4 and 5) being attached together by at least one clamping bolt (6) and a compression spring, and an eccentric mechanism (18) is for changing said diameter of said drum (2).

2. A drum (2), according to claim 1, wherein said drum (2) is an imaging cylinder of an electro-photographic printing machine.

3. A drum (2), according to claim 1, wherein said drum (2) is a fuser roller.

4. A drum (2), according to claim 1, wherein said drum (2) is a pressure roller for rolling across a conveyor belt.

5. A drum (2), according to claim 1, wherein said drum (2) is an intermediate roller for transferring an image from an imaging cylinder to a sheet of paper.

* * * * *